United States Patent
Franco et al.

(10) Patent No.: US 6,749,742 B2
(45) Date of Patent: Jun. 15, 2004

(54) SULFER-REDUCTION TREATMENT IN CATALYTICALLY PROCESSED GASOLINE AND INTERMEDIATE DISTILLATES OF CRUDE OIL BY MEANS OF A SILICA GEL

(75) Inventors: Israel Quiroz Franco, Tamaulipas (MX); Mariano Fernández Garcia, Mexico City (MX)

(73) Assignee: Fians Capital, S.A., de C.V., Mexico City (MX)

( * ) Notice: Subject to any disclaimer, the term of this patent is extended or adjusted under 35 U.S.C. 154(b) by 0 days.

(21) Appl. No.: 10/006,330

(22) Filed: Dec. 5, 2001

(65) Prior Publication Data

US 2003/0106840 A1 Jun. 12, 2003

(51) Int. Cl.⁷ ................ C10G 25/00; C10G 29/00
(52) U.S. Cl. ............ 208/245; 208/208 R; 208/221; 208/213; 208/299; 208/301; 208/16; 422/188; 422/190; 585/820
(58) Field of Search ............... 208/245, 208 R, 208/221, 213; 585/820

(56) References Cited

U.S. PATENT DOCUMENTS

| | | | | | |
|---|---|---|---|---|---|
| 1,387,857 | A | * | 8/1921 | McKee | 95/93 |
| 3,051,646 | A | * | 8/1962 | Brooke | 208/250 |
| 3,475,122 | A | * | 10/1969 | McCrae et al. | 423/539 |
| 3,630,890 | A | * | 12/1971 | Carr et al. | 208/208 R |
| 3,630,943 | A | * | 12/1971 | Meyers et al. | 252/180 |
| 3,859,414 | A | * | 1/1975 | Urban | 423/222 |
| 6,107,535 | A | * | 8/2000 | Rossini et al. | 585/823 |
| 6,118,037 | A | * | 9/2000 | Piccoli et al. | 585/820 |

* cited by examiner

Primary Examiner—Walter D. Griffin
Assistant Examiner—James Arnold, Jr.
(74) Attorney, Agent, or Firm—Medlen & Carroll LLP

(57) ABSTRACT

A chemical treatment is disclosed for reducing the sulfur content of catalytically processed gasoline and intermediate crude-oil products, by absorbing the sulfur contained in such catalytically processed products on silica gel packed in a filter or assembly of filters, operating at the normal exit pressure from production of catalytically processed gasoline and distillation of intermediate crude-oil products.

7 Claims, 2 Drawing Sheets

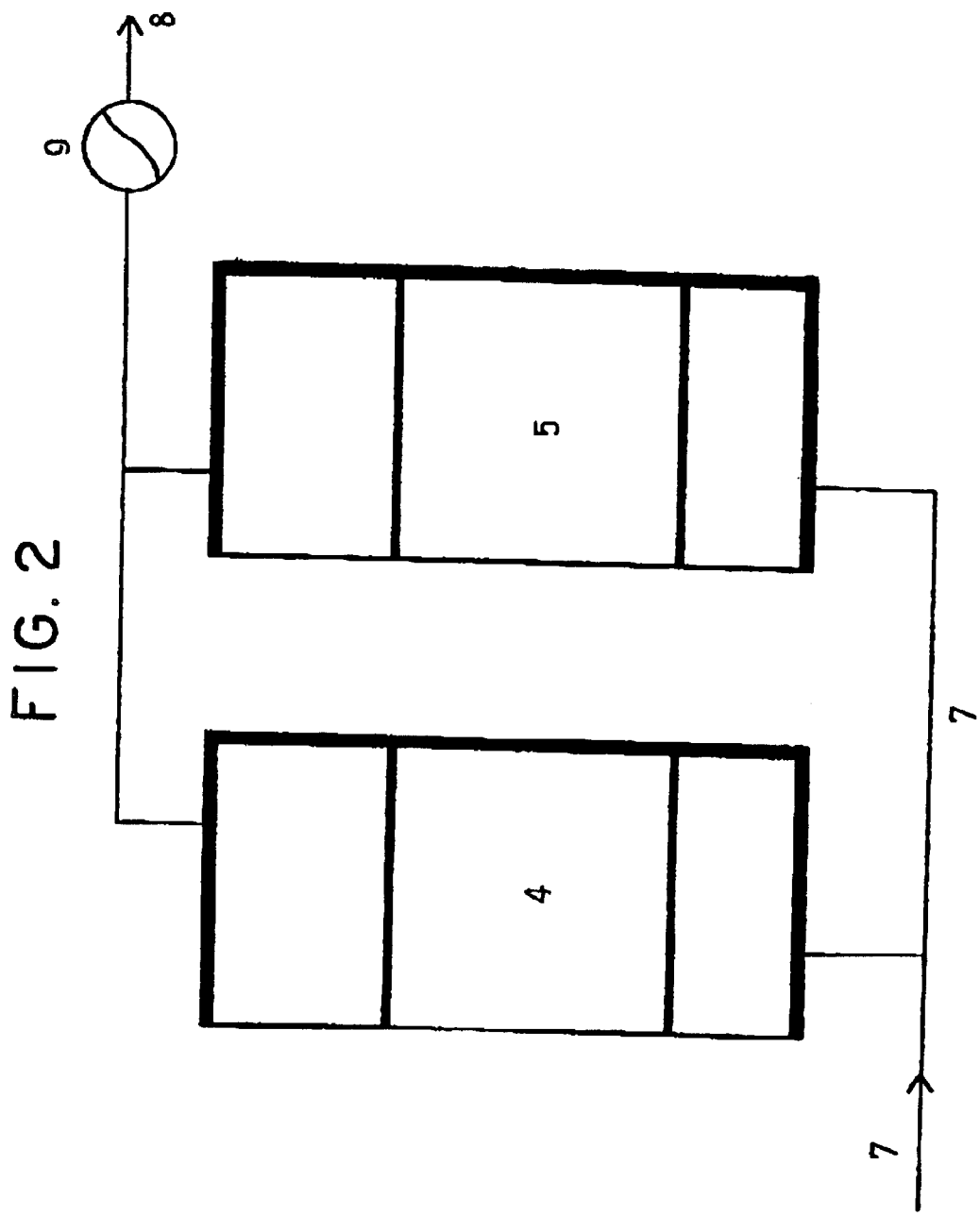

SULFER-REDUCTION TREATMENT IN CATALYTICALLY PROCESSED GASOLINE AND INTERMEDIATE DISTILLATES OF CRUDE OIL BY MEANS OF A SILICA GEL

TECHNICAL FIELD OF THE INVENTION

The invention is described in relation to the processes by which catalytical gasoline and intermediate distillates of crude oil are produced, and more specifically, of sulfer-reduction in catalytical gasoline and intermediate distillates of crude oil.

BACKGROUND OF THE INVENTION

Sulfur is found in deposits of crude oil and is one of its principal contaminants. This crude-oil contaminant produces severe corrosion problems at refining companies and is one of the principal contaminants in petroleum-derived fuels (gasoline, diesel fuel, turbine fuel, etc.). Today, there are a variety of processes by which the amount of sulfer in intermediate distillates of crude oil (turbine, gasoline, and Diesel fuel) can be reduced in the world's oil refineries. The most commonly used of these processes are Hydrodesulfurization plants and Perco plants whose process employs aluminum-charged catalytic chambers operating at temperatures from 380° C. to 430° C.

Both processes require installation of a plant with various types of costly, sophisticated equipment (heat exchangers, distillation towers, accumulators, process heaters, catalyst-packed reactors or vessels, condensers, coolers, pumping equipment, auxiliary services (cooling towers, cooling water, electric power, etc.). Operating costs are thus considerable.

In the 1960s and 70s, problems of environmental pollution produced by vehicle combustion were minimal and there were no worldwide regulations issued by governments to control polluting emissions. Because a great deal of publicity had arisen concerning environmental pollution, particularly in cities with high population and vehicular density, in the 80s the governments of highly industrialized nations demanded that refining companies improve the quality of gasolines and diesel fuel and replace petroleum fuels with natural gas in thermoelectric power plants and in industry in general. The principal improvements in fuels (gasoline and diesel fuel) involved production of high-octane, lead-free and low-sulfur gasolines, as well as high-octane, low-sulfur diesel fuel, for the purpose of reducing emission of pollutants to a minimum (unburned hydrocarbons, CO, $SO_2$, $NO_x$, etc.) from internal combustion engines. In the 1980's, for example, gasoline catalytically produced in Mexico was obtained with a final boiling point (FBP) of 225° C. because there were no limitations on sulfur content in these gasolines.

Production of higher-quality gasolines and diesel fuel in these countries was achieved through installation of various types of plants—hydrodesulftnization, reforming, catalytic, alkylation, TAME, MBE, etc.—some of which make use of by-products from processes already installed in the refineries, to obtain flows of high-octane, low-sulfur hydrocarbons serving as stock for production of high-quality gasoline.

During the 1990's pollution reached a critical level, and environmental regulations from governments throughout the world became quite strict in all areas (water, ground, air), as pollution is rampant at the world level. The critical global problem of the future is that, as oil fields are exploited, the sulfur content in crude is increasing. The profits from catalytically processed gasoline (high-octane gasoline) are gradually diminishing throughout the world. Due to the sulfur parameters required for public sale of gasoline and established by governments at globally, in order to reduce environmental pollution.

For all the above reasons, the inventor submitting this application investigated various alternatives, among which he considered the most attractive (from technical, economic, and ecological standpoints) to be those consisting of a new treatment for catalytically processed gasolines and intermediate distillates from crude oil, which eliminates the disadvantages of the previous method.

SUMMARY OF THE INVENTION

The chemical processing proposed in this invention requires installation of only two vessels (filters) packed with silica gel. The sulfur is absorbed by the silica gel, and the catalytically processed gasoline leaving the filter has low sulfur content. The silica gel-charged filter will operate at the temperature and pressure existing when the gasoline finishes the MEROX treatment, the feature distinguishing the chemical treatment proposed in this invention and existing chemical treatments being that there is a tremendous difference in costs and space for installation of these processes.

Environmental pollution caused by combustion of products derived from o petroleum (diesel fuel, gasoline, etc.) has continued to increase as the number of motor vehicles has risen throughout the world. Because of the specification of sulfur content in gasolines, in the 90s catalytically processed gasoline was obtained with a boiling point of 207° C. The maximum sulfur content in catalytically processed gasoline is 0.20%. For a 40,000 barrels/day catalytic plant, the above signifies a production loss of approximately 2000 barrels/day of catalytically processed gasoline. With regard to the processing of crude in its refineries, Mexico currently experiences a production loss of 20,000 barrels/day. The cost per barrel of catalytically processed gasoline is 30.00 dollars per barrel, taking into account the treatment proposed in this patent, this means an additional production of 600,000 dollars a day.

Furthermore, for Mexico this would mean a reduction in loss of foreign exchange, as Mexico now imports this high-octane gasoline from the U.S. and Venezuela.

The principal benefit from the proposed process stems from the fact that, as mentioned above, sulfur content in processed crudes is constantly increasing because the crudes are becoming heavier and higher in sulfer, and the loss in gasoline production continues to increase. This problem is one faced by all crude-refining companies throughout the world.

Considering all the disadvantages of the previous methodology, the inventor submitting this application has conducted a number of studies, tests, and experiments aimed at devising an innovative chemical treatment to reduce sulfur content. The treatment may be used in catalytic production processes for gasoline and intermediate crude-oil product distillation processes in refineries and would be of utmost significance with respect to the engineering involved in the invention.

A principal objective of this invention is providing a chemical treatment based on sulfur-reducing, silica gel-packed filters operating at the exit pressure from catalytic-gasoline and intermediate-crude production processes, to reduce sulfur.

DETAILED DESCRIPTION OF THE INVENTION

Figure 1:
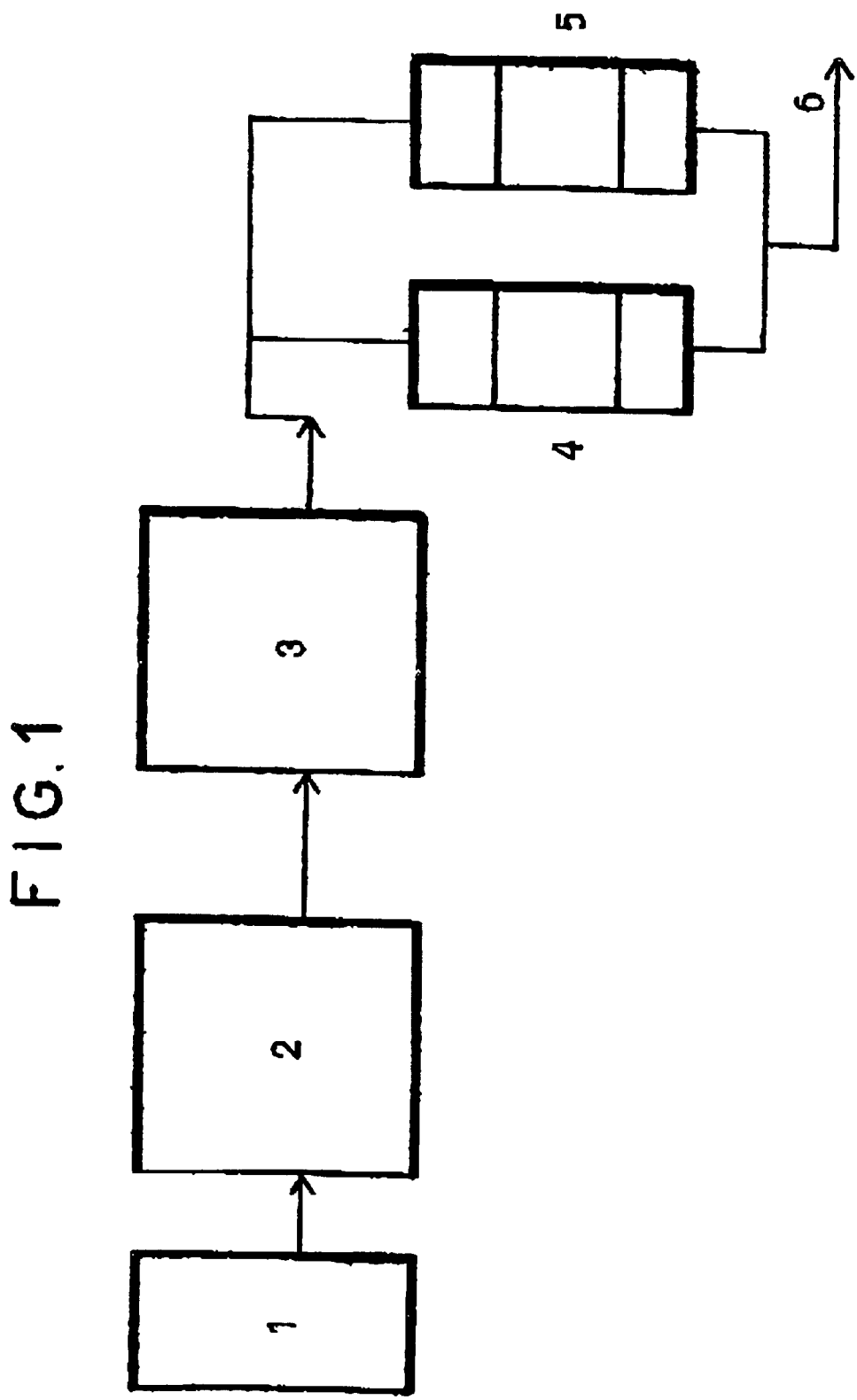
FIG. 1 is a diagram of conventional flow in a process, showing the use of silica gel-packed filters of the present invention used at the conclusion of the MEROX desulfurizer treatment; and, FIG. 2 is a diagram of an assembly for regeneration of silica gel packing of the filters of this invention.

In refineries throughout the world crude oil is processed and distilled in combined plants (not illustrated); the following products are obtained in an atmospheric tower (not illustrated): primary gasoline, turbine fuel or naphtha and diesel fuel. High-vacuum gasolines are obtained in the vacuum distillation tower (not illustrated) and delivered as a charge to the catalytic plant. Catalytic plants (not illustrated) produce as the principal product catalytically processed gasoline through thermal catalytic cracking (not illustrated) of high-vacuum gasolines in the reactor possessed by these plants.

With reference to FIG. 1, high-sulfur catalytically processed gasoline (2), distilled in the fractionating tower (1), acquired from crude from oil fields is sent to a debutanization tower (not illustrated) to remove light hydrocarbons (butane, propane, etc.) and sulfur in a chemical treatment (MEROX) (3). The reduction of sulfur in this treatment (3) is limited.

As mentioned previously, however, the specifications for sulfur content in gasoline limit the production of catalytically processed gasoline (6), and production losses are currently approximately 10% of catalytically processed gasoline (6). This production loss is increasing year after year as heavier and heavier crudes with greater sulfur content are processed.

In the present invention, two silica gel-packed filters (4) and (5) are preferably installed at the catalytically processed gasoline exit from MEROX chemical treatment (3), for the purpose of absorbing the sulfur not eliminated in the MEROX treatment (3) in the silica gel, and obtaining catalytically processed gasoline (6) with less than 0.15% sulfur content, but with a boiling point of 225° C. instead of a boiling point of 207° C. with which catalytically processed gasoline (6) is obtained at present, and therewith achieving greater gasoline production.

Filters (4) and (5) are to operate at the exit temperature and pressure of gasoline from the MEROX treatment (3) possessed by catalytic plants.

The silica gel-absorbed sulfur from the catalytically processed gasoline will saturate the silica gel packed in filter (4), for which reason it is necessary to regenerate the silica gel to remove the sulfur and have the silica gel recover its ability to absorb sulfur. Because of this, it is recommended that two silica gel-charged filters (4) and (5) be installed. One filter (4) works by absorbing sulfur from the gasoline and the other filter (5) acts as a backup when working filter (4) is saturated with sulfur.

The output of catalytically processed gasoline (6) from the silica gel-packed filters will be sent to a tank (not illustrated) with the required specifications, as they are not altered by the treatment proposed in this invention.

TABLE 1

Laboratory results for reduction of sulfur in Petroleum distillates.

| | |
|---|---|
| Type of distillate | FCC gasoline |
| Reducer quantity in grams | 100 |
| Filtration rate in milliliters per second | 0.185 |
| Type of reaction | Exothermic |
| Pressure | Atmospheric |
| Appearance | Yellow |
| Sulfur content in % weight | 0.1956 |
| Method employed for sulfur assay | ASTM D 4294 |

| | Sulfur % weight | Reduction % | Appearance |
|---|---|---|---|
| Results at different quantities of filtered distillate: | | | |
| 30 ml of filtrate | 0.0258 | 86.80 | Clear |
| 50 ml of filtrate | 0.0467 | 76.63 | Clear |
| 100 ml of filtrate | 0.0687 | 64.88 | Clear |
| 200 ml of filtrate | 0.1752 | 10.40 | Clear |
| The reducer was then regenerated at 120 degrees centigrade for eight hours and then refiltered. The following results were obtained: | | | |
| 30 ml of filtrate | 0.1011 | 48.30 | Clear |
| 50 ml of filtrate | 0.1041 | 46.80 | Clear |
| 100 ml of filtrate | 0.1152 | 41.10 | Clear |
| 200 ml of filtrate | 0.1310 | 33.03 | Clear |
| The reducer was then regenerated at 120 degrees centigrade for eight hours and then refiltered. The following results were obtained: | | | |
| 30 ml of filtrate | 0.1282 | 34.40 | Clear |
| 50 ml of filtrate | 0.1421 | 27.14 | Clear |
| 100 ml of filtrate | 0.1555 | 20.50 | Clear |
| 200 ml of filtrate | 0.1786 | 8.69 | Clear |

TABLE 2

Characteristics of gasoline before and after the treatment in this invention.

| Tests | Units | Before and after treatment | | Method |
|---|---|---|---|---|
| Adjusted ASTM Distillation at 760 mmHg | | | | |
| IBP | ° C. | 44 | 42 | ASTM D86 |
| 10% by volume | ° C. | 58 | 56 | ASTM D86 |
| 30% by volume | ° C. | 75 | 74 | ASTM D86 |
| 50% by volume | ° C. | 100 | 98 | ASTM D86 |
| 90% by volume | ° C. | 174 | 172 | ASTM D86 |
| FBP | ° C. | 202 | 202 | ASTM D86 |
| Recuperated | % vol. | 98 | 98 | ASTM D86 |
| RON | — | 90.3 | 90.0 | D 2699 |
| Sulfur | % wt. | 0.19 | 0.15 | D 4294 |
| ASTM color | — | 0.5 | — | D 1500 |
| Saybolt color | — | — | +16 | D 156 |
| Preformed gums | mg/100 ml | 2.6 | 0.8 | D 381 |
| Aromatic compounds | % vol. | 22.8 | 21.9 | D 1319 |
| Olefins | % vol. | 31.6 | 31.1 | D 1319 |
| Saturated compounds | % vol. | 45.6 | 47.0 | D 1319 |
| MON | — | 80.4 | 80.3 | D 2700 |

Monitoring of the Proposed Chemical Treatment

It is necessary to determine the sulfur content in the flow of catalytically processed gasoline at the filter exit (4) at least twice per shift using the ASTM-D4294 method.

With regard to FIG. 2, filter (4) is changed based on the sulfur content at the exit of gasoline (6) from the filter, for the chemical treatment to be continuous with sulfur results within specifications and maximum catalytically processed gasoline (6) production. When filter (4) is saturated with sulfur, the entry and exit of catalytically processed gasoline (6) is blocked, and filter (4) will go to be regenerated with air to oxidize the sulfur to $SO_2$ (8).

Silica Gel Regeneration

Still in reference to FIG. 2, when the exit of catalytically processed gasoline from filter (4) contains 0.15% sulfur, it is necessary to take filter (4) out of operation and begin operation of back-up filter (5). This occurs because the silica gel is saturated with sulfur and its absorption capacity has diminished.

During the tests conducted at laboratory level, the silica gel regeneration was performed in full at 450° C. thereby allowing the silica gel to recover its sulfur-absorption capacity. The regeneration of Grade 11 silica gel is performed in the following manner:

1. Open the lower relief valve of filter (4) to empty all gasoline (6) from the filter.
2. Open the air-discharge valve of the main blower (not illustrated) toward filter (4) to feed with it regeneration air for the lower part of filter (4).
3. Pressurize filter (4) until filter (4) pressure equals the air-line pressure.
4. Open the upper regeneration valve (9) of the filter (4) toward the sulfur plant (not illustrated).
5. Control the temperature of the silica gel bed with injection of regeneration air (7) to maintain a temperature of 450° C. The flow of air (7) is adjusted to keep increasing the temperature until reaching the previously mentioned temperature.
6. When a temperature of 450° C. is reached and does not increase despite the increase in flow of air (7), the silica gel regeneration will be completed.
7. Upon termination of the regeneration, stop the regeneration air (7) and feed in dry refinery service air to cool filter (4); expose filter (4) to atmospheric air; close upper regeneration valve (9) of filter (4) toward the sulfur plant (not illustrated).

With the above procedure, filter (4) will be available for re-use when filter (5), which is in operation, is saturated with sulfur.

TABLE 3

Laboratory results for reduction of sulfur in petroleum distillates.

| | |
|---|---|
| Type of distillate | gasoline |
| Reducer quantity in grams | 100 |
| Filtration rate in milliliters per second | 0.185 |
| Type of reaction | Exothermic |
| Pressure | Atmospheric |
| Appearance | Yellow |
| Sulfur content in % weight | 0.1986 |
| Method employed for sulfur assay | ASTM D 4294 |

| Result: | SULFER % WEIGHT | REDUCTION | APPEARANCE |
|---|---|---|---|

TABLE 3-continued

Laboratory results for reduction of sulfur in petroleum distillates.

| | | |
|---|---|---|
| 200 ml of filtrate | 0.1300 | clear |

The reducer was then regenerated at 450 degrees centigrade for 18 hours.

| | | |
|---|---|---|
| 200 ml of filtrate | 0.1310 | clear |
| 200 ml of filtrate | 0.1350 | clear |
| 200 ml of filtrate | 0.1350 | clear |

The reducer was then regenerated at 450 degrees centigrade for 18 hours.

| | | |
|---|---|---|
| 200 ml of filtrate | 0.1300 | clear |

The reducer was then regenerated another three times in succession, yielding similar sulfur-content results, which indicates that the reducer is regenerable in the indicated conditions.

With the preferred embodiment thus described, it will be apparent to experts in the field that several changes and modifications can be made in this invention without deviating from the spirit and scope of the following claims:

What is claimed is:

1. A treatment using silica gel to reduce sulfur in catalytically processed gasoline and in intermediate crude-oil distillates, characterized by use of a chemical absorption filter including a silica gel packing for absorbing the sulfur present in catalytic and intermediate crude-oil distillates and not eliminated in sulfur-reduction processes employed in catalytic cracking and intermediate crude-oil distillation plants, and further characterized by producing catalytically processed gasoline with a sulfur content of less than between 0.14% and 0.16% by weight.

2. The treatment in accordance with claim 1, characterized by producing catalytically processed gasoline with a FBP (final boiling point) approximately between 220° C. and 225° C.

3. The treatment in accordance with claim 1, characterized by employing 28,200 Grade-12 silica gel packed in a vessel or filter open at both ends, through which circulates a flow of catalytically processed gasolines or intermediate crude-oil distillates containing sulfur.

4. The treatment in accordance with claim 1, characterized by installation of silica gel-packed filters at the exit from catalytically processed gasoline and intermediate crude-oil production processes, provided for subsequent reduction of sulfur content.

5. The treatment in accordance with claim 1, characterized by the use of multiple filters assembled in series for reduction of sulfur content in catalytically processed gasolines and intermediate crude-oil distillates.

6. The treatment in accordance with claim 1, wherein the filter operates at the exit temperature and pressure of gasoline after sulfur-reduction treatments at catalytic plants.

7. The treatment in accordance with claim 1, characterized by the fact that the filter is used until the output of catalytically processed gasoline from the filter contains 0.15% sulfur by weight, at which time the filter must be changed.

* * * * *